(12) United States Patent
Watamura et al.

(10) Patent No.: US 10,936,014 B2
(45) Date of Patent: Mar. 2, 2021

(54) PORTABLE INFORMATION APPARATUS HAVING A DISPLAY

(71) Applicant: LENOVO (SINGAPORE) PTE. LTD., Singapore (SG)

(72) Inventors: Kenji Watamura, Kanagawa (JP); Limin Xiao, Kanagawa (JP)

(73) Assignee: LENOVO (SINGAPORE) PTE LTD, Singapore (SG)

( * ) Notice: Subject to any disclaimer, the term of this patent is extended or adjusted under 35 U.S.C. 154(b) by 0 days.

(21) Appl. No.: 16/555,635

(22) Filed: Aug. 29, 2019

(65) Prior Publication Data

US 2020/0073440 A1 Mar. 5, 2020

(30) Foreign Application Priority Data

Aug. 31, 2018 (JP) ............................. JP2018-163046

(51) Int. Cl.
 *G06F 1/16* (2006.01)
 *G06F 3/0488* (2013.01)

(52) U.S. Cl.
 CPC .......... *G06F 1/1647* (2013.01); *G06F 1/1616* (2013.01); *G06F 1/1683* (2013.01); *G06F 3/0488* (2013.01); *G06F 2203/04804* (2013.01)

(58) Field of Classification Search
 CPC ............................. G06F 1/1647; G06F 3/0488
 USPC ..................................... 345/76, 173; 349/42
 See application file for complete search history.

(56) References Cited

U.S. PATENT DOCUMENTS

| | | | | |
|---|---|---|---|---|
| 9,939,571 | B2* | 4/2018 | Liu | G02B 5/305 |
| 2007/0193280 | A1* | 8/2007 | Tuskiewicz | F25D 29/00 62/3.6 |
| 2011/0157061 | A1* | 6/2011 | Kao | G06F 3/045 345/173 |
| 2012/0084697 | A1* | 4/2012 | Reeves | G06F 3/04883 715/772 |
| 2014/0132488 | A1* | 5/2014 | Kim | G06F 1/1637 345/76 |
| 2015/0146123 | A1* | 5/2015 | Jung | G02F 1/136286 349/42 |
| 2015/0370388 | A1* | 12/2015 | Choi | G06F 3/044 345/173 |

(Continued)

FOREIGN PATENT DOCUMENTS

| | | |
|---|---|---|
| JP | 2003296022 A | 10/2003 |
| JP | 2009258935 A | 11/2009 |

(Continued)

*Primary Examiner* — Prabodh M Dharia
(74) *Attorney, Agent, or Firm* — Antony P. Ng; Russell Ng PLLC (57) ABSTRACT

An electronic apparatus having a display that appears to be floating in air is disclosed. The electronic apparatus includes a display; a first transparent plate that covers a display surface of the display; a second transparent plate that covers a non-display surface of the display; and a film member provided between the second transparent plate and the display. The first transparent plate, the second transparent plate, and the film member have a first region that overlaps with the display and a second region that does not overlap with the display when viewed from the side of the display surface. The film member includes a touch sensor unit provided in the second region and a wire aggregation provided in the first region.

17 Claims, 8 Drawing Sheets

(56) References Cited

U.S. PATENT DOCUMENTS

| | | | | |
|---|---|---|---|---|
| 2016/0085118 A1* | 3/2016 | Lee | ................. | G02F 1/133512 |
| | | | | 349/62 |
| 2016/0224238 A1* | 8/2016 | Rothkopf | .............. | G06F 1/1647 |
| 2017/0228080 A1* | 8/2017 | Furutani | ............... | G06F 3/0416 |
| 2017/0357118 A1* | 12/2017 | Cheng | .................... | G06F 3/044 |
| 2018/0188774 A1* | 7/2018 | Ent | ..................... | G06F 1/1618 |
| 2018/0253165 A1* | 9/2018 | Feng | .................... | G02B 5/0284 |
| 2019/0391692 A1* | 12/2019 | Park | ......................... | G01L 1/18 |
| 2020/0073439 A1* | 3/2020 | Amano | ................ | G06F 1/1683 |
| 2020/0073448 A1* | 3/2020 | Xiao | .................. | G06F 3/03547 |
| 2020/0201101 A1* | 6/2020 | Tsuchihashi | ......... | G06F 1/1637 |

FOREIGN PATENT DOCUMENTS

| | | | |
|---|---|---|---|
| JP | 2010066918 | A | 3/2010 |
| JP | 2010154099 | A | 7/2010 |
| JP | 2011248667 | A | 12/2011 |
| JP | 2012230519 | A | 11/2012 |
| JP | 2013041470 | A | 2/2013 |
| JP | 2014029673 | A | 2/2014 |
| JP | 2015026343 | A | 2/2015 |
| JP | 2015512549 | A | 4/2015 |
| JP | 2016-164731 | A | 9/2016 |
| WO | 2017110995 | A1 | 12/2017 |

* cited by examiner

PORTABLE INFORMATION APPARATUS HAVING A DISPLAY

PRIORITY CLAIM

The present application claims benefit of priority under 35 U.S.C. §§ 120, 365 to the previously filed Japanese Patent Application No. JP2018-163046 with a priority date of Aug. 31, 2018, which is incorporated by reference herein.

TECHNICAL FIELD

The present invention relates to electronic apparatuses in general, and in particular to a portable information apparatus having a display.

BACKGROUND

A portable information apparatus commonly includes a first main body and a second main body configured to be movable with respect to each other. In general, for such a portable information apparatus, a portion between a display and a frame is opaque.

SUMMARY

The present disclosure provides an electronic apparatus having a display that appears to be floating in air.

In accordance with an embodiment of the present disclosure, an electronic apparatus includes a display; a first transparent plate that covers a display surface of the display; a second transparent plate that covers a non-display surface of the display; and a film member that is provided between the second transparent plate and the display, and includes a touch sensor unit formed into a transparent film and a wire aggregation. The first transparent plate, the second transparent plate, and the film member have a first region that overlaps with the display and a second region that does not overlap with the display when viewed from the side of the display surface. The touch sensor unit is provided in the second region, and the wire aggregation is provided in the first region.

All features and advantages of the present disclosure will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION

Figure 1:
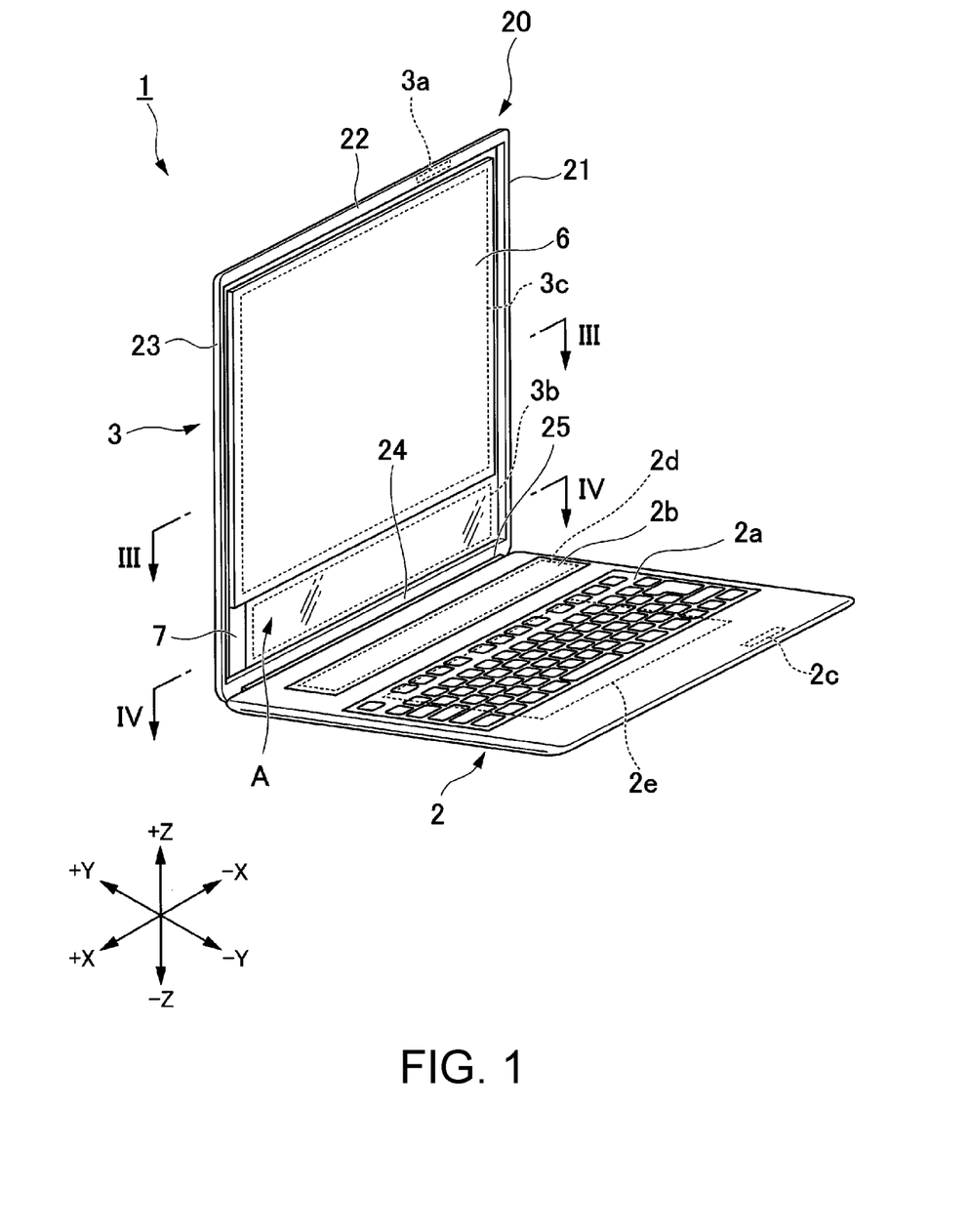
FIG. 1 is a perspective view of an electronic apparatus, according to one embodiment.

As shown in FIG. 1, an electronic apparatus 1 is a so-called clamshell laptop personal computer (PC) that includes a first main body 2 and a second main body 3. The first main body 2 and the second main body 3 are relatively movable around a hinge 25 between a state where the second main body 3 is open with respect to the first main body 2 and a state where the second main body 3 is closed with respect to the first main body 2. In other words, the second main body 3 and the first main body 2 can overlap each other.

It is to be noted that the present embodiment may be applied not only to a laptop PC but also to electronic apparatuses such as a tablet terminal and a cell-phone.

I. Definition of Directions

In the present embodiment, a positional relationship between components is described with an XYZ Cartesian coordinate system. Hereinafter, a direction along the X-axis is referred to as a right-left direction X; a direction along the Y-axis is referred to as a front-rear direction Y; and a direction along the Z-axis is referred to as a top-bottom direction Z. Furthermore, one side in the right-left direction X is referred to as the +X side (the left), and the other side is referred to as the −X side (the right). One side in the front-rear direction Y is referred to as the +Y side (the rear), and the other side is referred to as the −Y side (the front). One side in the top-bottom direction Z is referred to as the +Z side (the top), and the other side is referred to as the −Z side (the bottom).

The second main body 3 includes a display 6. The display 6 has a display surface and a non-display surface. In FIG. 1, the −Y side is the side of the display surface of the display 6, and the +Y side is the side of the non-display surface of the display 6.

The hinge 25 connects a −Z-side end of the second main body 3 and a +Y-side end of the first main body 2, and extends in the right-left direction X. The hinge 25 allows the second main body 3 to make a rotational movement between an open state and a closed state with respect to the first main body 2. It is to be noted that the closed state is a state where the second main body 3 and the first main body 2 overlap each other. The open state is a state where the second main body 3 has moved at least a predetermined amount of distance from the closed state, thus a sub display 2b to be described later is exposed.

It is to be noted that in the following description, unless otherwise specially noted, the positional relationship between components is described on the basis of a posture of the second main body 3 when its height and length extend in the top-bottom direction Z and the right-left direction X, respectively.

II. First Main Body

The first main body 2 includes a flat chassis with its length and width extending in the right-left direction X and the front-rear direction Y, respectively. Inside the chassis, a motherboard (a circuit board), a battery, etc. are installed.

The first main body 2 is rotatably connected to the second main body 3 through the hinge 25. It is to be noted that the first main body 2 and the second main body 3 may be configured to be separable from each other.

The first main body 2 is provided with an input unit 2a, the sub display 2b, a detecting unit 2c, a touch sensor 2d (a first touch sensor), and a control unit 2e.

The input unit 2a is, for example, a keyboard.

The sub display 2b is, for example, a liquid crystal display (LCD) or an organic electroluminescence (EL) display. The sub display 2b has a rectangular shape that is long in the right-left direction X and short in the front-rear direction Y. The sub display 2b is located closer to the +Y side than the input unit 2a is. In other words, the sub display 2b is provided in a position closer to the hinge 25 than the input unit 2a is.

The touch sensor 2d is provided in a position that overlaps with the sub display 2b. More specifically, the sub display 2b is covered with a cover glass from the +Z side, and the touch sensor 2d is attached to a −Z-side surface of the cover glass. Therefore, the touch sensor 2d covers the sub display 2b from the +Z side. The sub display 2b and the touch sensor 2d constitute one touch panel.

The touch sensor 2d is configured to be able to detect a position where a user has touched. Furthermore, the touch sensor 2d is transparent, thus the sub display 2b is visually recognizable through the touch sensor 2d.

The control unit 2e shown in FIG. 1 controls the touch sensor 2d and a touch sensor 3b (to be described later) on the basis of a result of detection by the detecting unit 2c, and puts them into an enabled (ON) state or a disabled (OFF) state. The control unit 2e may be part of the motherboard, or may be part of a circuit board other than the motherboard.

The detecting unit 2c detects whether the second main body 3 is in the open state or in the closed state. The detecting unit 2c is provided at a −Y-side end of the first main body 2. An object 3a to be detected is provided at a +Z-side end of the second main body 3. The detecting unit 2c and the object 3a to be detected are provided in positions identical in the right-left direction X. Thus, when the second main body 3 is in the closed state, the detecting unit 2c of the first main body 2 and the object 3a to be detected of the second main body 3 face each other. As the detecting unit 2c, a magnetic sensor, such as a Hall sensor, can be used. As the object 3a to be detected, a magnet can be used. The detecting unit 2c detects a change in a magnetic field caused by the object 3a to be detected in accordance with the movement of the second main body 3 between the open state and the closed state, and therefore can detect whether the second main body 3 is in the open state or in the closed state.

It is to be noted that the detecting unit 2c may be provided in the second main body 3, and the object 3a to be detected may be provided in the first main body 2. Furthermore, a sensor (for example, an infrared sensor) other than a magnetic sensor may be used as the detecting unit 2c.

III. Second Main Body

The second main body 3 includes the display 6. The display 6 is, for example, an LCD or an organic EL display. A wire 7 is connected to the display 6. The display 6 and the motherboard, etc. of the first main body 2 are electrically connected through the wire 7.

The second main body 3 has a transparent region A. When the second main body 3 is viewed from the front-rear direction Y, except for a portion connected to the wire 7, the display 6 is surrounded by the transparent region A. This makes the display 6 appear to be floating in the air.

Figure 2:
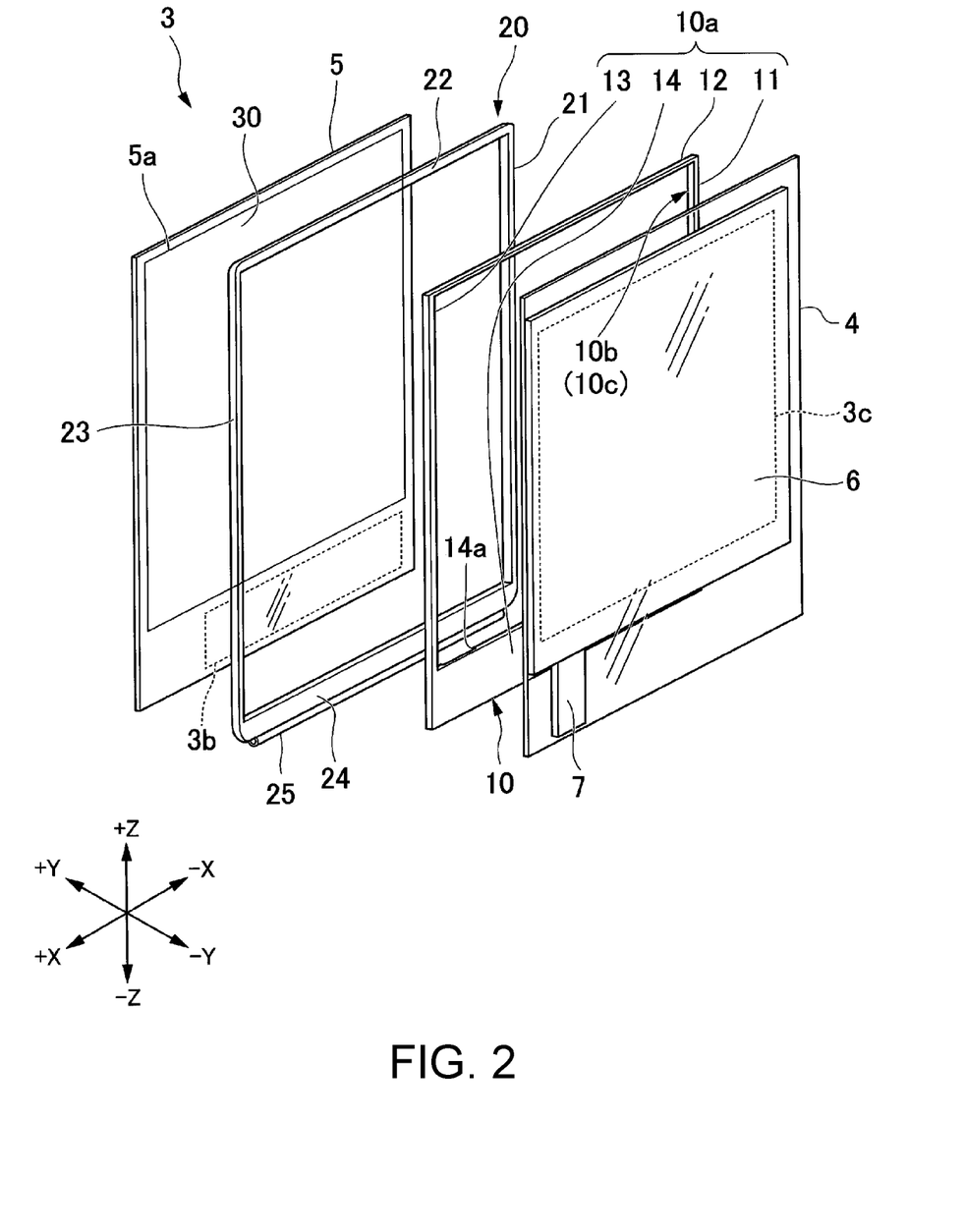
FIG. 2 is an exploded perspective view of a second main body shown in FIG. 1.

As shown in FIG. 2, the second main body 3 includes a first transparent plate 4, a transparent member 10, a frame body 20, a second transparent plate 5, the display 6, and a film member 30. The transparent region A is made up by an overlap of the first transparent plate 4, the transparent member 10, the film member 30, and the second transparent plate 5 in the front-rear direction Y.

The first transparent plate 4 and the second transparent plate 5 hold the frame body 20, the transparent member 10, and the display 6 in the front-rear direction Y between them. The first transparent plate 4 is located closer to the −Y side than the display 6 is, and the second transparent plate 5 is located closer to the +Y side than the display 6 is. The first transparent plate 4 covers the display surface (a −Y-side surface) of the display 6. The second transparent plate 5 covers the non-display surface (a +Y-side surface) of the display 6.

The first transparent plate 4 and the second transparent plate 5 are formed into a transparent plate with its height and length extending in the top-bottom direction Z and the right-left direction X, respectively. In the present embodiment, the first transparent plate 4 and the second transparent plate 5 are formed into a rectangle when viewed from the front-rear direction Y. As the first transparent plate 4 and the second transparent plate 5, for example, glass or transparent resin can be used.

The frame body 20 is made of, for example, a metallic material, such as aluminum alloy and magnesium alloy, or fiber-reinforced plastic. The frame body 20 includes a right frame 21, a top frame 22, a left frame 23, and a bottom frame 24. The frame body 20 is formed of these frames 21 to 24 into a rectangular frame viewed from the front-rear direction Y. The right frame 21 and the left frame 23 extend in the top-bottom direction Z, and the top frame 22 and the bottom frame 24 extend in the right-left direction X. The top frame 22 connects respective +Z-side ends of the right frame 21 and the left frame 23. The bottom frame 24 connects respective −Z-side ends of the right frame 21 and the left frame 23.

The hinge 25 is provided on a −Z-side end of the bottom frame 24.

Figure 3:
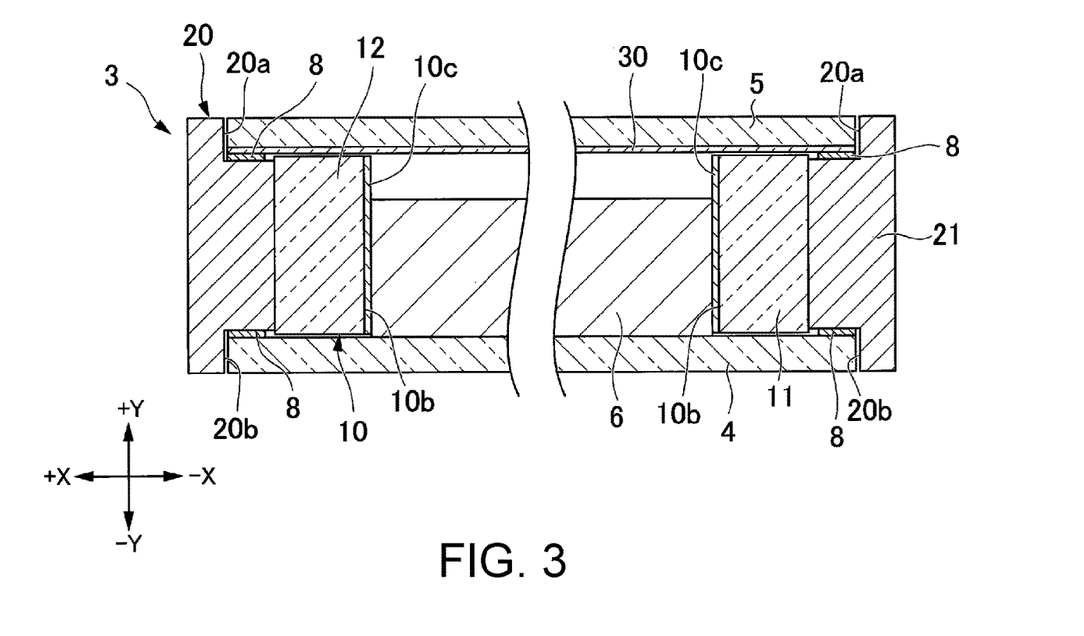
FIG. 3 is a cross-sectional view of the second main body along a line III-III shown in FIG. 1.

As shown in FIG. 3, the frame body 20 has a first recessed portion 20a and a second recessed portion 20b. The first recessed portion 20a is recessed from a +Y-side end surface of the frame body 20 toward the −Y side. The second recessed portion 20b is recessed from a −Y-side end surface of the frame body 20 toward the +Y side. The first recessed portion 20a and the second recessed portion 20b are formed along the frames 21 to 24 of the frame body 20. Thus, the recessed portions 20a and 20b are formed into a rectangular frame viewed from the front-rear direction Y.

The recessed portions 20a and 20b are formed on a +X-side end of the right frame 21, a −Z-side end of the top frame 22, a −X-side end of the left frame 23, and a +Z-side end of the bottom frame 24. Respective dimensions of the recessed portions 20a and 20b in the right-left direction X are greater than respective dimensions of the first and second transparent plates 4 and 5 in the right-left direction X. Respective dimensions of the recessed portions 20a and 20b in the top-bottom direction Z are greater than respective dimensions of the first and second transparent plates 4 and 5 in the top-bottom direction Z.

At least a portion of the first transparent plate 4 is located inside the first recessed portion 20a. The first transparent plate 4 is attached to an inner surface of the first recessed portion 20a with an adhesive 8. As the adhesive 8, for example, ultraviolet curing resin, thermoset resin, thermoplastic resin, or double-sided tape can be used. In an example of FIG. 3, the adhesive 8 is provided on an inner surface of the first recessed portion 20a that faces to the +Y side. Alternatively, the adhesives 8 may be provided on inner surfaces of the first recessed portion 20a that face to the right-left direction X.

Figure 7:
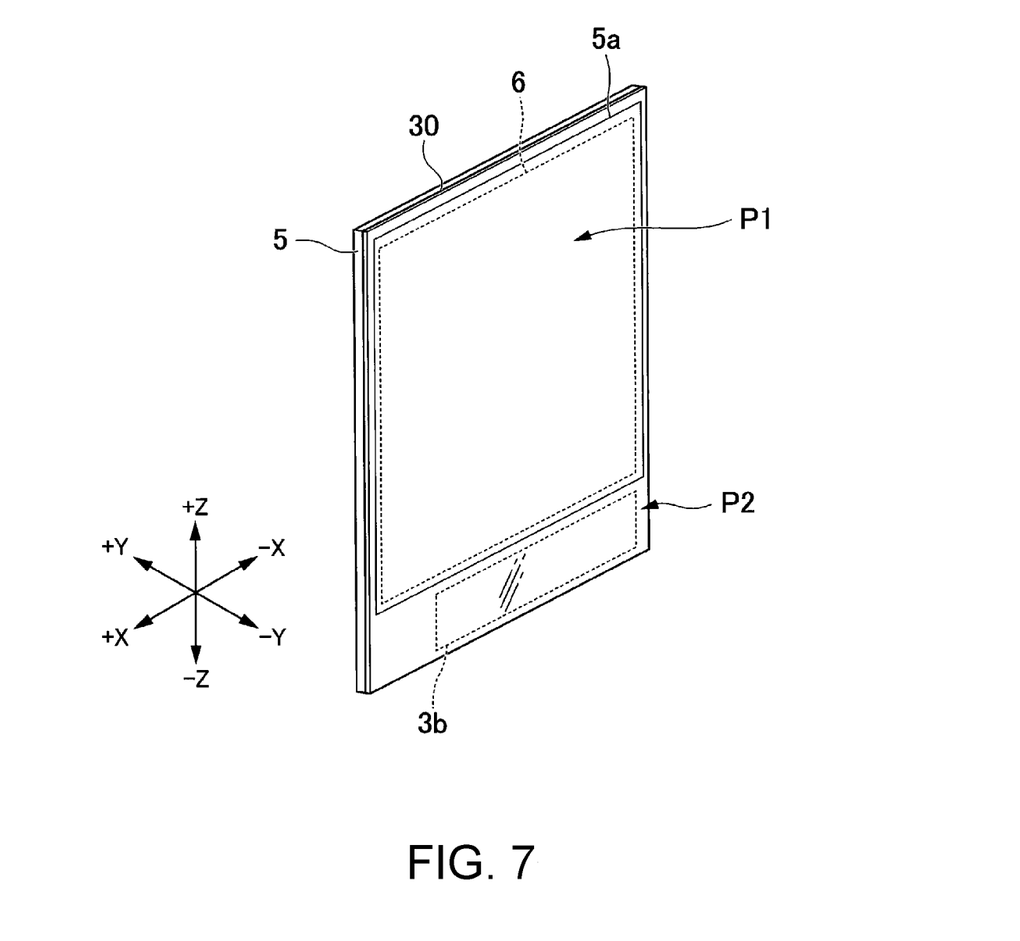
FIG. 7 is a diagram illustrating a first region and a second region.

As shown in FIGS. 2 and 7, the second transparent plate 5 has a colored layer 5a; at least a portion of the colored layer 5a overlaps with a first region P1 to be described later. The colored layer 5a is formed, for example, by printing. The colored layer 5a is formed on a −Y-side surface or a +Y-side surface of the second transparent plate 5. It is to be noted that in a case where the colored layer 5a is formed on the −Y-side surface of the second transparent plate 5, it is possible to suppress peeling of the colored layer 5a caused by the user or something touching it.

As shown in FIG. 3, the film member 30 is attached and fastened to the −Y-side surface of the second transparent plate 5. In a case where the colored layer 5a is formed on the −Y-side surface of the second transparent plate 5, the film member 30 is fastened to the second transparent plate 5 from above the colored layer 5a. At least a portion of the second transparent plate 5 is located inside the second recessed portion 20b. The second transparent plate 5 is attached to an inner surface of the second recessed portion 20b through the film member 30 with the adhesive 8. In the example of FIG. 3, the adhesive 8 is provided on an inner surface of the second recessed portion 20b that faces to the −Y side. Alternatively, the adhesives 8 may be provided on inner surfaces of the second recessed portion 20b that face to the right-left direction X.

The first transparent plate 4 and the second transparent plate 5 are attached and fastened to the frame body 20 with the multiple adhesives 8. In the present embodiment, the entire first transparent plate 4 is located inside the first recessed portion 20a, and the entire second transparent plate 5 is located inside the second recessed portion 20b.

The display 6 is fastened to the first transparent plate 4. The display 6 is, for example, an LCD or an organic EL display. The user can visually recognize the display 6 through the first transparent plate 4. The display 6 is formed into a rectangle when viewed from the front-rear direction Y. The wire 7 is connected to the display 6. A process of connecting the wire 7 to the display 6 can be performed after the display 6, the first transparent plate 4, and the transparent member 10 are incorporated into the frame body 20. Thus, even if the display 6 is fastened to the first transparent plate 4, the wire 7 can be housed in a wire housing 14a (to be described later) of the transparent member 10.

It is to be noted that in a case where the second main body 3 is used as a touch panel, a touch sensor 3c may be provided between the display 6 and the first transparent plate 4 (see FIG. 2). It is to be noted that an active area of the touch sensor 3c is indicated by a broken line in FIG. 2, etc. The active area of the touch sensor 3c is larger than an active area of the display 6. Furthermore, a wire aggregation of the touch sensor 3c is provided around the active area of the touch sensor 3c and is hidden by a colored bezel. However, the bezel is located within the transparent region A.

The transparent member 10 is made of transparent resin. As a material of the transparent member 10, for example, polycarbonate (PC) or polymethyl methacrylate (PMMA) can be used. The transparent member 10 may be formed by injection molding, or may be formed by cutting.

As shown in FIG. 2, the transparent member 10 includes an enclosure 10a that surrounds the display 6. In the present embodiment, the enclosure 10a is formed into a rectangular frame so as to surround the rectangular display 6. The enclosure 10a has a right part 11, a top part 12, a left part 13, and a bottom part 14. The right part 11, the top part 12, the left part 13, and the bottom part 14 are integrally formed. That is, the enclosure 10a is integrally formed.

A gap between the right part 11 and the left part 13 in the right-left direction X is larger than a dimension of the display 6 in the right-left direction X. A gap between the top part 12 and the bottom part 14 in the top-bottom direction Z is larger than a dimension of the display 6 in the top-bottom direction Z.

A dimension of the transparent member 10 in the right-left direction X is smaller than a gap between the right frame 21 and the left frame 23 of the frame body 20 in the right-left direction X. A dimension of the transparent member 10 in the top-bottom direction Z is smaller than a gap between the top frame 22 and the bottom frame 24 of the frame body 20 in the top-bottom direction Z.

The right part 11 is located on the −X side of the display 6; the top part 12 is located on the +Z side of the display 6; the left part 13 is located on the +X side of the display 6; and the bottom part 14 is located on the −Z side of the display 6.

The right part 11 and the left part 13 extend in the top-bottom direction Z, and the top part 12 and the bottom part 14 extend in the right-left direction X. The top part 12 connects respective +Z-side ends of the right part 11 and the left part 13. The bottom part 14 connects respective −Z-side ends of the right part 11 and the left part 13.

A width of the bottom part 14 in the top-bottom direction Z is larger than a width of the top part 12 in the top-bottom direction Z. Furthermore, the width of the bottom part 14 in the top-bottom direction Z is larger than respective widths of the right part 11 and the left part 13 in the right-left direction X. That is, the width of the bottom part 14 is larger than those of the other parts 11 to 13 of the enclosure 10a.

The bottom part 14 is provided with the wire housing 14a. The wire housing 14a is a recessed portion formed on the bottom part 14. The wire housing 14a is recessed from a +Y-side end surface of the bottom part 14 toward the −Y side. The wire housing 14a is located at an end of the bottom part 14 in the right-left direction X. The wire housing 14a extends from a +Z-side end surface to a −Z-side end surface of the bottom part 14 in the top-bottom direction Z. That is, the wire housing 14a is formed so as to cross the bottom part 14 in the top-bottom direction Z.

Figure 4:
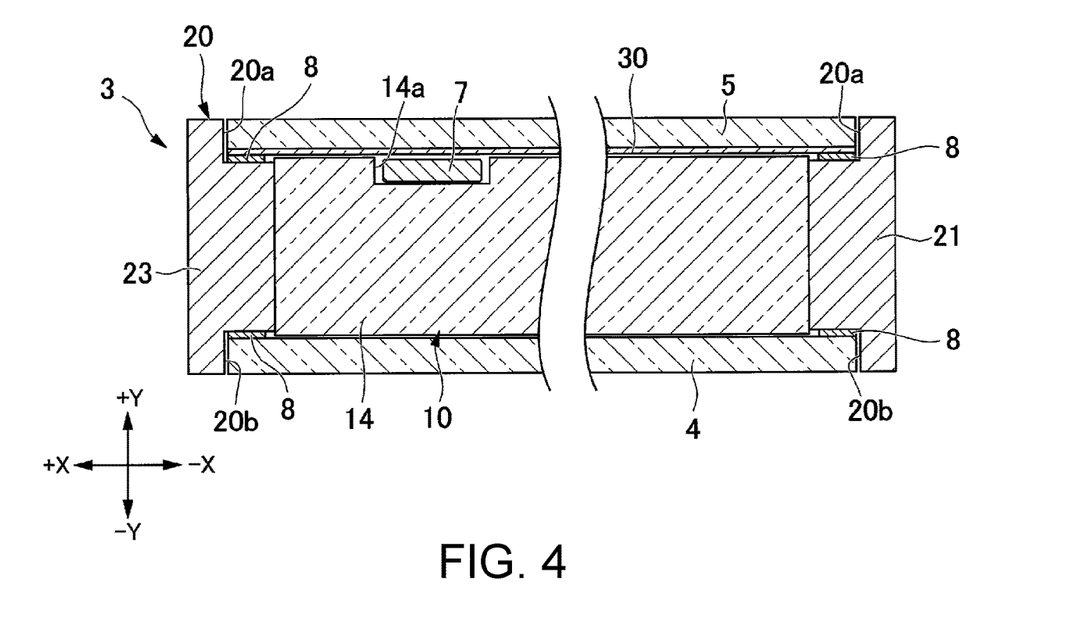
FIG. 4 is a cross-sectional view of the second main body along a line IV-IV shown in FIG. 1.

As shown in FIG. 4, a width of the wire housing 14a in the right-left direction X is larger than a width of the wire 7 in the right-left direction X. A width (a depth) of the wire housing 14a in the front-rear direction Y is larger than a thickness of the wire 7 in the front-rear direction Y. At least a portion of the wire 7 is located inside the wire housing 14a.

It is to be noted that the width of the wire housing 14a in the front-rear direction Y may be smaller than the thickness of the wire 7 in the front-rear direction Y. Also in this case, for example, by providing a gap in the front-rear direction Y between the transparent member 10 and the second transparent plate 5, the wire 7 can be housed in a space formed by the wire housing 14a and the second transparent plate 5.

As shown in FIG. 3, of the enclosure 10a, an inner surface 10b facing the display 6 is provided with a thin film 10c. It is to be noted that the inner surface 10b includes a +X-side end surface of the right part 11, a −Z-side end surface of the top part 12, a −X-side end surface of the left part 13, and the +Z-side end surface of the bottom part 14. As a material of the thin film 10c, metal such as aluminum is suitable. The thin film 10c can be provided on the surface of the inner surface 10b, for example, by vapor deposition or plating. By forming a reflecting surface on the surface of the inner surface 10b with the thin film 10c, for example, an end surface of the display 6 becomes less visually recognizable through the transparent member 10. It is to be noted that a reflecting surface may be formed on the inner surface 10b not only by coating but also, for example, by mirror-polishing the inner surface 10b.

The transparent member 10 is located inside the frame body 20 formed into a frame. Furthermore, the display 6 is located inside the transparent member 10 formed into a frame. Then, the transparent member 10 and the display 6 are held between the first transparent plate 4 and the second transparent plate 5 in the front-rear direction Y.

In the above-described configuration, the transparent member 10 is provided to fill the gaps formed by the frame body 20, the display 6, the first transparent plate 4, and the second transparent plate 5.

Figure 5:
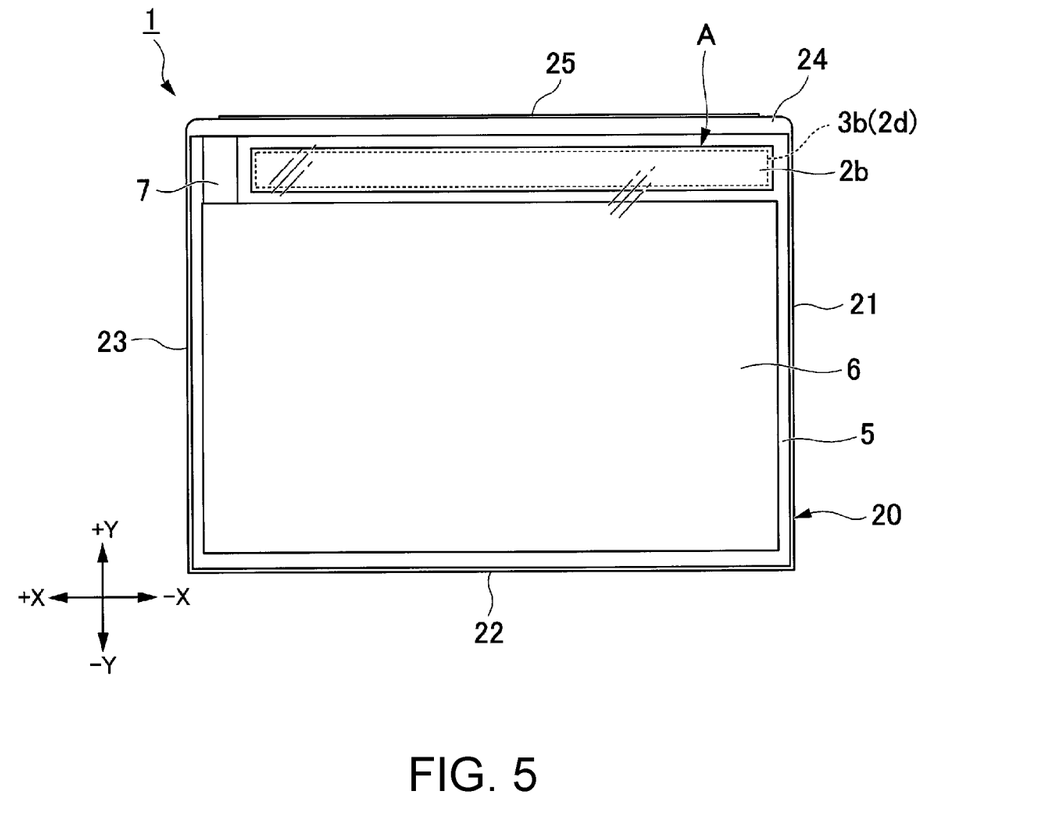
FIG. 5 is a diagram of the electronic apparatus viewed from the side of the second main body when the second main body shown in FIG. 1 is in a closed state.

FIG. 5 shows a state where the second main body 3 and the first main body 2 overlap each other after the second main body 3 has been moved rotationally around the hinge 25 from the state shown in FIG. 1.

As shown in FIG. 5, when the second main body 3 and the first main body 2 overlap each other, the positions of the transparent region A and the sub display 2b coincide with each other. More specifically, respective overlapping portions of the first transparent plate 4, the bottom part 14 of the transparent member 10, and the second transparent plate 5 cover the sub display 2b. Thus, the user can visually recognize the sub display 2b through the transparent region A.

As shown in FIG. 1, the second main body 3 here is provided with the touch sensor 3b (a second touch sensor) and the touch sensor 3c (a third touch sensor). The touch sensors 3b and 3c are configured to be able to detect a position where the user has touched. Furthermore, the touch sensors 3b and 3c are transparent. As the touch sensors 3b and 3c, a capacitive sensor can be used, as with the touch sensor 2d.

Figure 6A:
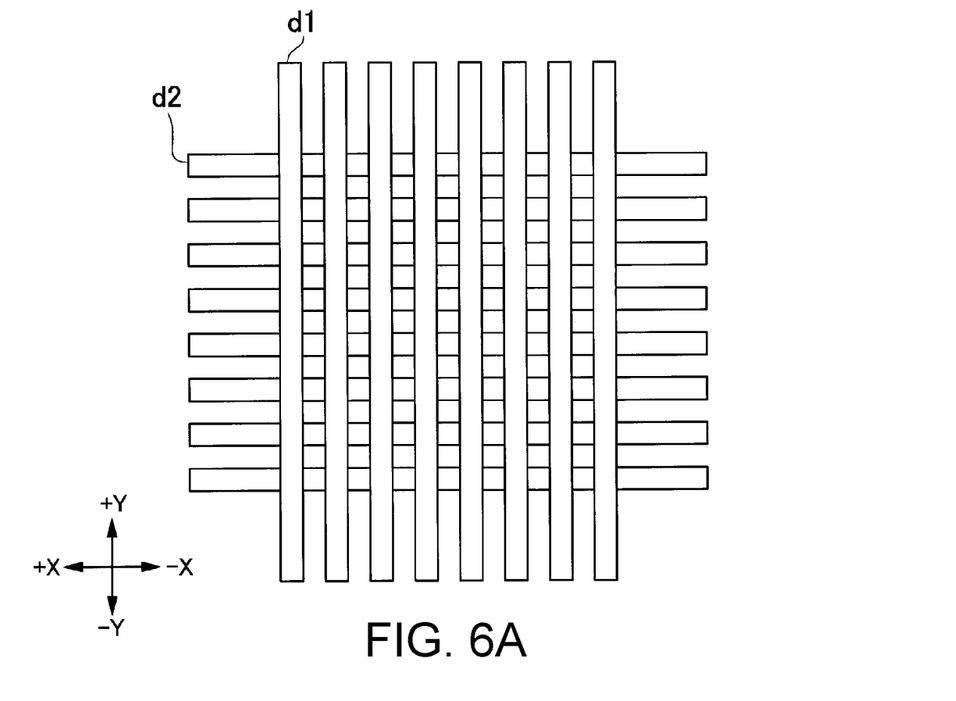
FIG. 6A is a diagram showing a touch sensor.
Figure 6B:
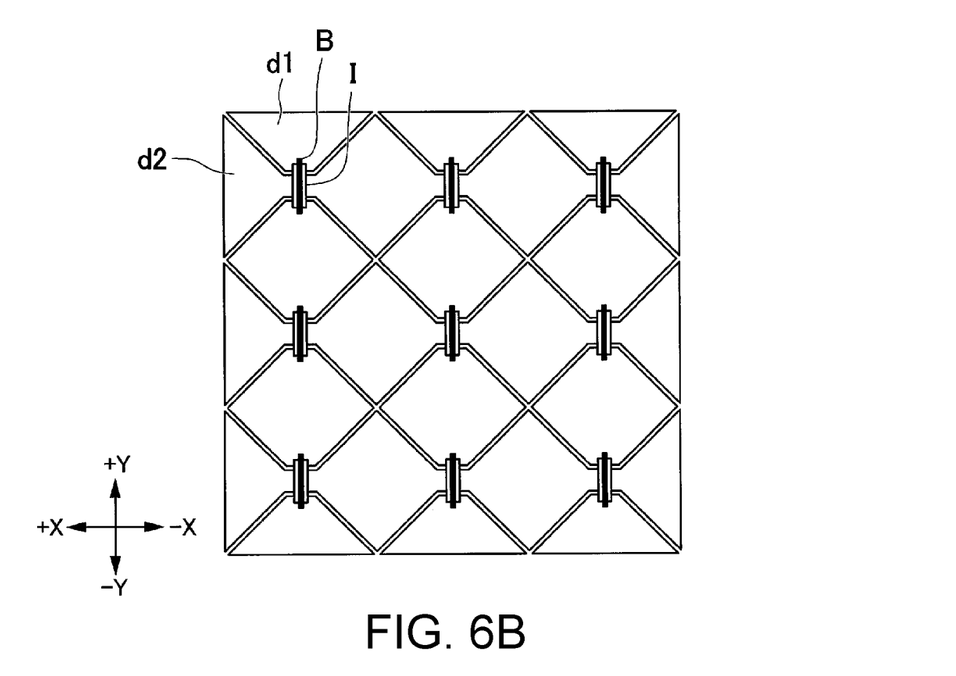
FIG. 6B is a diagram showing another configuration example of the touch sensor.

For example, capacitive sensors shown in FIGS. 6A and 6B can be used as the touch sensors 2d, 3b, and 3c. In FIGS. 6A and 6B, the sensors have multiple wires d1 and d2. The wires d1 and the wires d2 are insulated from each other. The multiple wires d1 extend in the front-rear direction Y, and are aligned in the right-left direction X. The multiple wires d2 extend in the right-left direction X, and are aligned in the front-rear direction Y. In this way, the wires d1 and the wires d2 extend in directions intersecting with (substantially perpendicular to) each other, and form multiple points of intersection when viewed from the top-bottom direction Z. The capacitance at each point of intersection changes when touched by the user. Thus, by detecting a change in the capacitance, an area touched by the user can be identified.

In an example of FIG. 6A, the wires d1 and the wires d2 are formed into straight lines. As the wires d1 and the wires d2, superfine copper wire mesh (for example, with a width of about 1 to 10 μm) or indium tin oxide (ITO) tile can be used. In a case of FIG. 6A, for example, the multiple wires d1 may be provided on one of surfaces of one insulator film, and the multiple wires d2 may be provided on the other surface. Furthermore, an insulator film provided with the wires d1 may be superimposed on an insulator film provided with the wires d2. These configurations can generate capacitance between the wires d1 and the wires d2 while insulating the wires d1 from the wires d2. In a configuration shown in FIG. 6A, one touch sensor has two electrode layers: an electrode layer including the multiple wires d1 and an electrode layer including the multiple wires d2.

In an example of FIG. 6B, the wires d1 and the wires d2 form a shape of a plurality of rectangles joined together. At points of intersection between the wires d1 and the wires d2, the rectangular wires d1 are connected by bridge wires B. By providing insulators I between the bridge wires B and the wires d2, capacitance can be generated between the wires d1 and the wires d2 while the wires d1 and the wires d2 are insulated from each other. In a configuration shown in FIG. 6B, one touch sensor has one electrode layer including the multiple wires d1 and the multiple wires d2.

The touch sensor 3c is provided in a position that overlaps with the display 6 when the display 6 is viewed from its display surface side (the −Y side). The touch sensor 3c is provided on a +Y-side surface of the first transparent plate 4 (see FIG. 2). The user can visually recognize the display 6 through the first transparent plate 4 and the touch sensor 3c. Thus, the user can use the touch sensor 3c and the display 6 as one touch panel. In this case, the first transparent plate 4 serves as a cover glass of the touch sensor 3c. That is, the user can operate the touch sensor 3c by touching the surface of the first transparent plate 4.

The touch sensor 3b constitutes part of the transparent film member 30. The film member 30 includes a transparent film, and the touch sensor 3b is provided on the film. The film of the film member 30 may be a glass film, or may be a plastic film. The film member 30 is attached to the second transparent plate 5 over its entire −Y-side surface (on the side of the display surface of the display 6). Thus, the film member 30 covers the entire surface of the second transparent plate 5. The touch sensor 3b is located in, of the film member 30, a portion closer to the −Z side than the display 6 is. The touch sensor 3b overlaps with a portion of the bottom part 14 of the transparent member 10. The touch sensor 3b is partially located within the transparent region A.

Figure 8A:
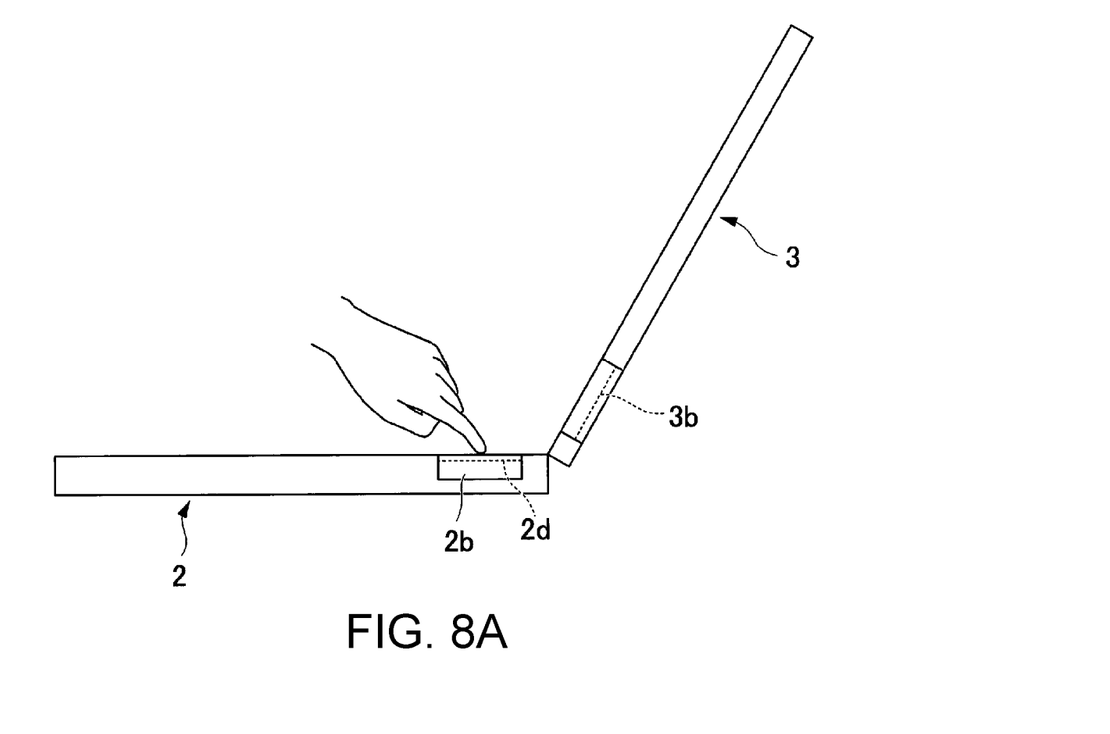
FIG. 8A is a diagram showing use of the electronic apparatus shown in FIG. 1 when the second main body is in an open state.
Figure 8B:
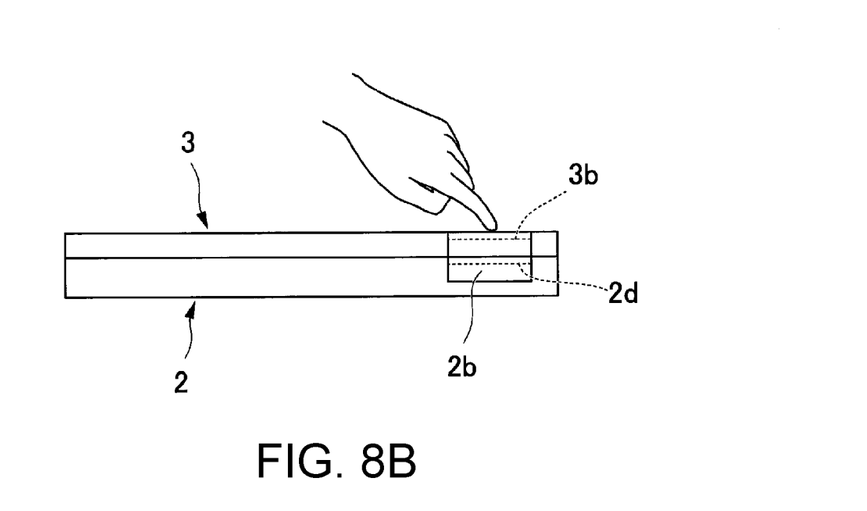
FIG. 8B is a diagram showing use of the electronic apparatus shown in FIG. 1 when the second main body is in the closed state.

As shown in FIG. 5, the touch sensor 3b is provided in a position that overlaps with the sub display 2b when viewed from the top-bottom direction Z while the second main body 3 is in the closed state. The touch sensor 3b is transparent, thus, while the second main body 3 is in the closed state, the sub display 2b is visually recognizable through the touch sensor 3b. Accordingly, the user can use the touch sensor 3b and the sub display 2b as one touch panel as shown in FIG. 8B. In this case, the second transparent plate 5 serves as a cover glass of the touch sensor 3b. That is, the user can operate the touch sensor 3b by touching the surface of the second transparent plate 5. On the other hand, in a case where the second main body 3 is in the open state, the touch sensor 2d and the sub display 2b can be used as one touch panel as shown in FIG. 8A. That is, in the electronic apparatus 1 according to the present embodiment, the sub display 2b can be operated as a touch panel regardless of whether the second main body 3 is in the open state or in the closed state.

In the present embodiment, a capacitive sensor shown in FIG. 6A is adopted as the touch sensor 3b. A more detailed configuration of the touch sensor 3b is described below with FIG. 9. It is to be noted that the following description of the touch sensor 3b is based on the premise that the second main body 3 is in the closed state (a state where the length and width of the touch sensor 3b extend in the right-left direction X and the front-rear direction Y, respectively).

Figure 9:
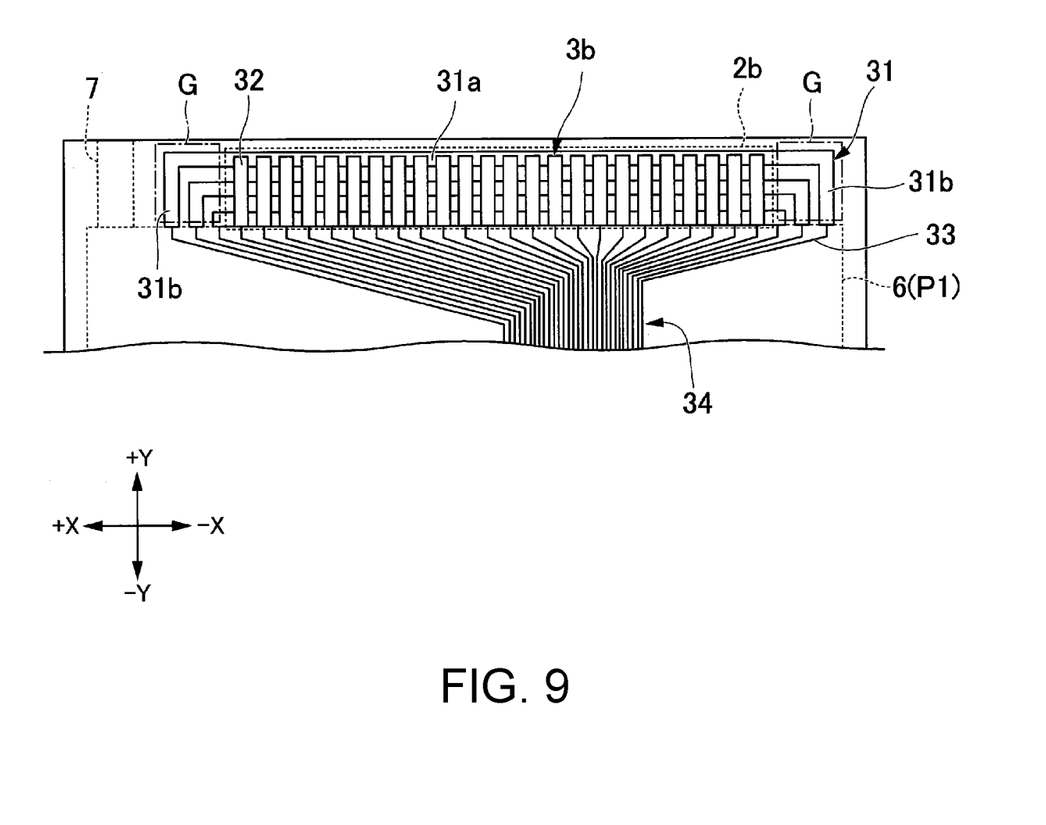
FIG. 9 is a diagram for explaining a configuration of a touch sensor unit shown in FIG. 5.

As shown in FIG. 9, the touch sensor 3b includes multiple first wires 31 and multiple second wires 32. As the first wires 31 and the second wires 32, superfine copper wire (thin metallic wire) (for example, with a width of 10 μm or less)

or a transparent electrode can be used. As a material of the transparent electrode, indium tin oxide (ITO) can be used.

The first wires 31 and the second wires 32 are insulated from each other. More specifically, the film included in the film member 30 is made of an insulator. Then, the first wires 31 are provided on a first surface of the film on the side of the first transparent plate 4, and the second wires 32 are provided on a second surface of the film on the side of the second transparent plate 5. Therefore, the first wires 31 and the second wires 32 are electrically insulated from each other through the film (the insulator) included in the film member 30.

The first wires 31 extend in the right-left direction X, and are arranged in the front-rear direction Y at intervals between them. The second wires 32 extend in the front-rear direction Y, and are arranged in the right-left direction X at intervals between them. In this way, the first wires 31 and the second wires 32 extend so as to intersect with each other, and form multiple points of intersection when viewed from the top-bottom direction Z.

A predetermined drive signal is input to the first wires 31. The drive signal is, for example, a pulse current (a pulse voltage). Since the points of intersection between the first wires 31 and the second wires 32 work as a capacitor, an output signal (current or voltage) according to the drive signal input to the first wires 31 is output to the second wires 32. The output signal varies according to a change in the capacitance at a point of intersection between the first wire 31 and the second wire 32 caused by the user having touched near the point of intersection. Therefore, by detecting respective output signals output to the second wires 32, an area touched by the user can be identified. That is, the first wires 31 are an input-side electrode to which the drive signal is input, and the second wires 32 are an output-side electrode to which an output signal is output.

At least some of the first wires 31 have a linear portion 31a extending in the right-left direction X and a bent portion 31b. The bent portion 31b is bent substantially at right angle. More specifically, the bent portions 31b are provided at both ends of the linear portion 31a in the right-left direction X, and are bent toward the front-rear direction Y. The linear portions 31a form points of intersection with the second wires 32. The bent portions 31b do not form any points of intersection with the second wires 32. Thus, the bent portions 31b do not serve as a touch sensor.

The film member 30 is provided with a ground G. The ground G is connected to the ground (a ground circuit), and is provided in a position closer to the second transparent plate 5 than the first wires 31 are. It is to be noted that the ground G may be formed on the same layer as the second wires 32 in the film member 30. The bent portions 31b are covered with the ground G. Just like the wires 31 and 32, the ground G is made of copper wire (thin metallic wire) with a width of 10 μm or less or ITO tile, and is not visually recognized. The occurrence of a change in the capacitance between the bent portions 31b and the ground G is suppressed by the ground G located between the second transparent plate 5 and the bent portions 31b. Therefore, for example, even if the user has touched, of the second transparent plate 5, a portion that covers the bent portion 31b, it is possible to suppress malfunction due to a detected change in the capacitance.

The second wires 32 are located closer to the second transparent plate 5 than the first wires 31 are. The second wires 32 are provided on a second surface of the film member 30 on the side of the second transparent plate 5. The first wires 31 are provided on a first surface of the film member 30 on the side of the first transparent plate 4. It is to be noted that one film member 30 may be composed of, for example, an insulator film provided with the first wires 31 superimposed on an insulator film provided with the second wires 32. That is, the film member 30 may be composed of one layer, or may be composed of multiple layers superimposed on top of another.

−Y-side ends of the second wires 32 and −Y-side ends of the bent portions 31b of the first wires 31 are each connected to a leader line 33. The leader lines 33 may be visually recognizable because they are not a part that serves as a transparent touch sensor. For example, in a case where the wires 31 and 32 are made of fine copper wire, the leader lines 33 may be copper wire with a width (for example, of more than 10 μm) larger than those of the wires 31 and 32. As shown in FIG. 9, the leader lines 33 are gathered at positions that overlap with the display 6 and compose a wire aggregation 34. The wire aggregation 34 is electrically connected to, for example, a printed circuit board (not shown) or the motherboard.

As described above, the film member 30 here is provided over the entire surface of the second transparent plate 5. Furthermore, the first transparent plate 4 covers the display surface of the display 6, and the second transparent plate 5 covers the non-display surface of the display 6. Therefore, as shown in FIG. 7, the first transparent plate 4, the second transparent plate 5, and the film member 30 have the first region P1 that overlaps with the display 6 and a second region P2 that does not overlap with the display 6 when viewed from the side of the display surface of the display 6 (the −Y side). Then, the touch sensor 3b (a touch sensor unit) is provided in, of the film member 30, the second region P2, and the wire aggregation 34 is provided in the first region P1.

It is to be noted that the touch sensor 3b is provided in, of the second region P2, a portion closer to the −Z side (a portion closer to the hinge 25) rather than a portion closer to the first region P1. The second region P2 constitutes a part of the transparent region A.

IV. Workings

As described above, the electronic apparatus 1 according to the present embodiment includes the display 6 and the first and second transparent plates 4 and 5 that hold the display 6 between them. Furthermore, the display 6 is surrounded by the transparent region A. This can make the display 6 appear to be floating in the air.

Then, the touch sensor 3b is provided in, of the film member 30, the second region P2, and the wire aggregation 34 is provided in the first region P1. This configuration allows the wire aggregation 34 to be hidden behind the display 6 and not be visually recognized. In this 5) way, the wire aggregation 34 is hidden behind the display 6 unlike a conventional way of hiding it by a colored bezel, thus it is possible to make the display 6 more certainly appear to be floating in the air.

Furthermore, the film member 30 covers the entire surface of the second transparent plate 5, thus it is possible to suppress an outline of the film member 30 from being visually recognized in the transparent region A. Therefore, the display 6 more certainly appears to be floating, and this can make the appearance of the second main body 3 better. Moreover, in case the second transparent plate 5 is broken, it is possible to suppress the scattering of broken pieces of the second transparent plate 5.

Furthermore, at least a portion of the second transparent plate 5 has the colored layer 5a that overlaps with the first region P1. Accordingly, when the second main body 3 is viewed from the side of the second transparent plate 5 (the side of the non-display surface of the display 6), the wire aggregation 34 can be hidden by the colored layer 5*a*, which further improves the appearance of the second main body 3. It is to be noted that the colored layer 5*a* may be provided so as to hide only the wire aggregation 34, or may be provided so as to hide the entire non-display surface of the display 6.

Moreover, in the touch sensor 3*b* of the film member 30, the first wires 31 are electrically connected to the wire aggregation 34 via their bent portion 31*b* bent substantially at right angle. This configuration allows respective paths of the leader lines 33 leading to the wire aggregation 34 to be located within the first region P1 as shown in FIG. 9, and allows the leader lines 33 to not be visually recognized.

Furthermore, the first main body 2 is provided with the sub display 2*b* that is visually recognizable through the transparent region A when the second main body 3 overlaps with the first main body 2. The touch sensor 3*b* overlaps with the sub display 2*b* when the second main body 3 overlaps with the first main body 2. Therefore, the user can operate the touch sensor 3*b* and the sub display 2*b* as one touch panel.

Moreover, at least some of the first wires 31 are provided with the bent portions 31*b* at the ends of a portion thereof extending in a first direction (the right-left direction X); the bent portions 31*b* are bent in a second direction (the front-rear direction Y) substantially perpendicular to the first direction. Accordingly, in a portion (the first region P1) that overlaps with the display 6, the first wires 31 can be connected to the leader lines 33, and the leader lines 33 are suppressed from being seen. That is, it is possible to suppress portions of the leader lines 33 from being visually recognized in the transparent region A and to make the display 6 more certainly appear to be floating.

Furthermore, the first wires 31 and the second wires 32 are made of thin metallic wire with a width of 10 μm or less or a transparent conductive material, which makes them visually unrecognizable to the naked eye. Therefore, it is possible to further enhance the transparency of the transparent region A (the second region P2).

Moreover, the bent portions 31*b* are covered with the ground G from the side of the non-display surface of the display 6 (the side of the second transparent plate 5). Thus, the occurrence of a change in the capacitance between the bent portions 31*b* which do not serve as the touch sensor 3*b* and their nearby second wires 32 is suppressed. Accordingly, it is possible to suppress malfunction of the touch sensor 3*b* when the user has touched, of the second transparent plate 5, a portion that covers the bent portion 31*b*.

It is to be noted that the technical scope of the present invention is not limited to the above-described embodiment, and various modifications can be made without departing from the scope of the invention.

For example, in the above-described embodiment, the second main body 3 and the first main body 2 are connected so as to be rotationally movable around the hinge 25; however, the second main body 3 and the first main body 2 may be configured to make a slide movement. Furthermore, the second main body 3 may be configured to be removable from the first main body 2.

Also in these cases, the closed state of the second main body 3 is a state where the second main body 3 and the first main body 2 overlap each other; and the open state of the second main body 3 is a state where the second main body 3 has moved at least a predetermined amount of distance from the closed state, and the sub display 2*b* is exposed.

As has been described, the present invention provides an electronic apparatus having a display that appears to be floating in air.

While the invention has been particularly shown and described with reference to a preferred embodiment, it will be understood by those skilled in the art that various changes in form and detail may be made therein without departing from the spirit and scope of the invention.

What is claimed is:

1. An electronic apparatus comprising:
   a first main body having a sub display; and
   a second main body rotationally connected to said first main body via a hinge, wherein said second main body includes
   a display;
   a first transparent plate covers a display surface of said display;
   a second transparent plate covers a non-display surface of said display;
   a transparent region formed by said first and second transparent plates, wherein said transparent region is located along an edge of said second main body adjacent to said hinge, wherein said transparent region includes a transparent touch sensor that overlaps with said sub display on said first main body when said second main body is in a closed state such that said sub display is recognizable through said transparent touch sensor; and
   a film member provided between said second transparent plate and said display, wherein said film member includes a touch sensor unit formed into a transparent film and a wire aggregation.

2. The electronic apparatus of claim 1, wherein said first and second transparent plates are longer than said display.

3. The electronic apparatus of claim 1, wherein at least a portion of said second transparent plate has a colored layer.

4. The electronic apparatus of claim 1, wherein said touch sensor unit includes a first wire and a second wire that intersects with said first wire and is electrically insulated from said first wire through an insulator.

5. The electronic apparatus of claim 4, wherein said first wire is electrically connected to said wire aggregation via a bent portion thereof that is bent substantially at right angle.

6. The electronic apparatus of claim 4, wherein said first wire is provided on a first surface of said transparent film, and said second wire is provided on a second surface of said transparent film.

7. The electronic apparatus of claim 6, wherein said first surface being closer to said first transparent plate than said second surface, and said transparent film includes said insulator.

8. The electronic apparatus of claim 1, wherein said first transparent plate, said second transparent plate, and said film member do not overlap with said display in said transparent region.

9. The electronic apparatus of claim 4, wherein said film member further includes a ground connected to a ground circuit.

10. The electronic apparatus of claim 9, wherein said ground covers said bent portion from a side of said non-display surface.

11. The electronic apparatus of claim 1, wherein said sub display includes a sub display touch sensor.

12. The electronic apparatus of claim 11, wherein said sub display and sub display touch sensor are located along an edge of said first main body adjacent to said hinge such that said sub display is visually recognizable through said transparent region when said second main body overlaps with said first main body.

13. The electronic apparatus of claim 12, wherein a user is allowed to access said sub display via said touch sensor in said transparent region of said second main body when said second main body overlaps with said first main body.

14. The electronic apparatus of claim 1, wherein said display is not in said transparent region.

15. The electronic apparatus of claim 14, wherein said transparent film of said touch sensor unit is provided within said transparent region.

16. The electronic apparatus of claim 1, wherein said first and second transparent plates are larger than said display.

17. The electronic apparatus of claim 16, wherein said display is surrounded by said transparent region such that said display appears to be floating in air.

* * * * *